Figure 1:
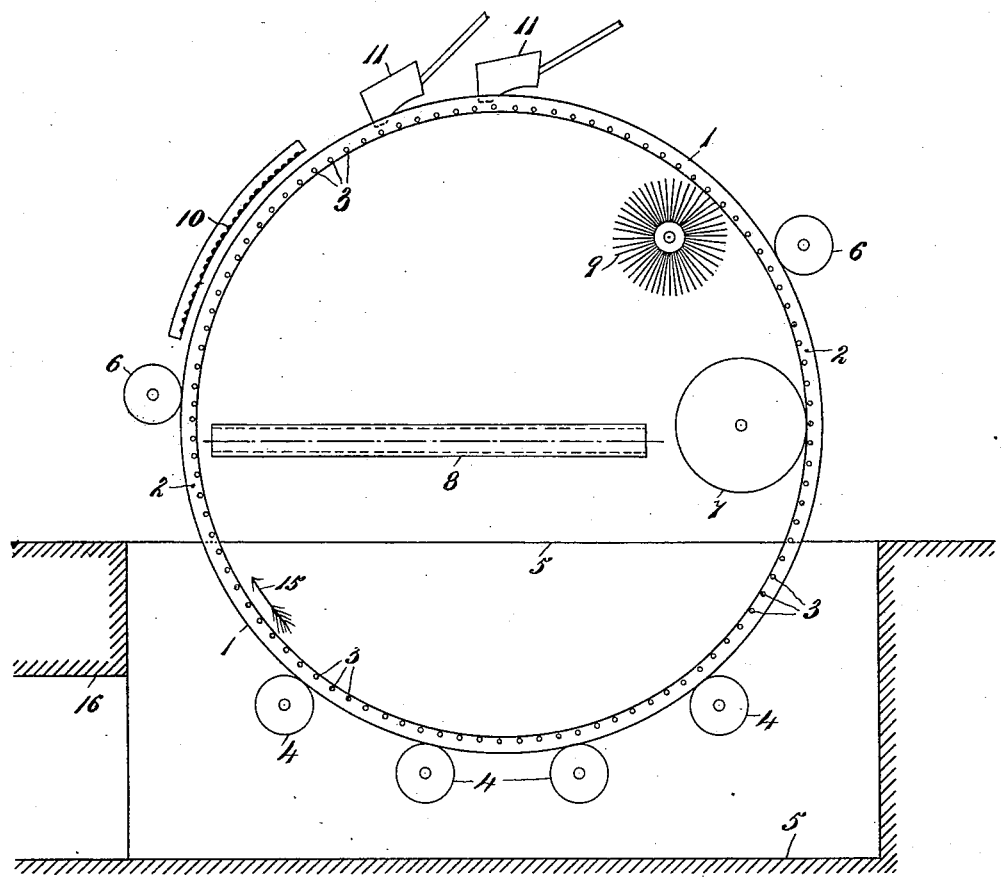

A. MANN.
DEVICE FOR PREVENTING THE ACCUMULATION OF NEEDLE ICE.
APPLICATION FILED JUNE 28, 1913.

1,086,831.

Patented Feb. 10, 1914.
2 SHEETS—SHEET 1.

Witnesses
Gertie Nickolson,
Ernest Smith.

Inventor
Alexander Mann

By Alfred F. Bratton
Attorney

A. MANN.
DEVICE FOR PREVENTING THE ACCUMULATION OF NEEDLE ICE.
APPLICATION FILED JUNE 28, 1913.
1,086,831.
Patented Feb. 10, 1914.
2 SHEETS—SHEET 2.
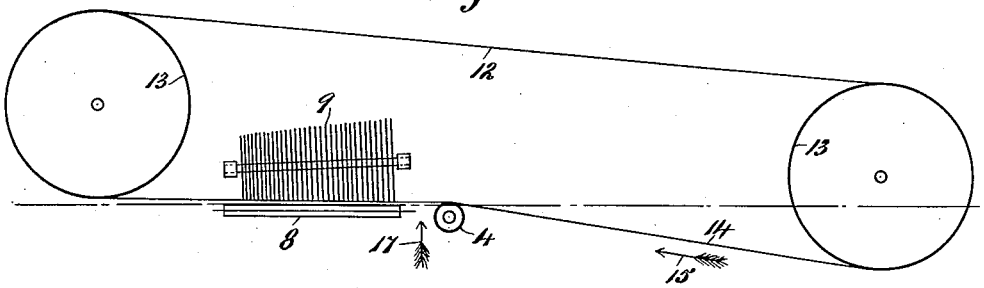
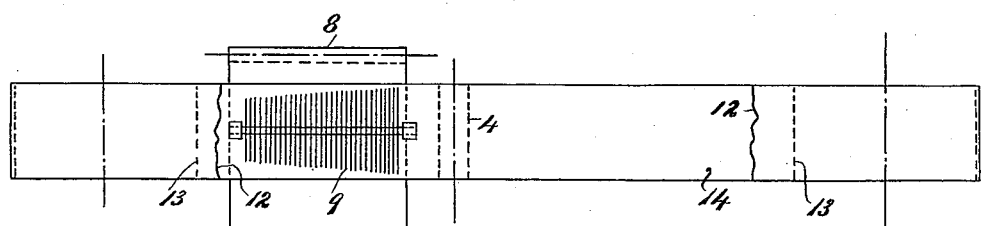
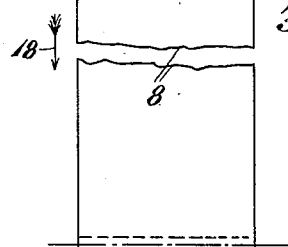
Witnesses
Gertie Nicholson,
Ernest Smith
Inventor
Alexander Mann
By Alfred T. Bratton.
Attorney

UNITED STATES PATENT OFFICE.

ALEXANDER MANN, OF HAMILTON, ONTARIO, CANADA.

DEVICE FOR PREVENTING THE ACCUMULATION OF NEEDLE-ICE.

1,086,831. Specification of Letters Patent. Patented Feb. 10, 1914.

Application filed June 28, 1913. Serial No. 776,288.

*To all whom it may concern:*

Be it known that I, ALEXANDER MANN, a subject of the King of Great Britain, and a citizen of the Dominion of Canada, residing at 455 King street east, in the city of Hamilton, in the county of Wentworth, Province of Ontario, Dominion of Canada, have invented a certain new and useful Device for Preventing the Accumulation of Needle-Ice, of which the following is a specification.

This invention relates to a device for preventing the accumulation of needle ice and it has more particular reference to means applicable to hydro-electric plants.

The main object of my invention is to prevent the ingress of frazil ice to the penstocks which frequently get fouled and clogged thereby with the result that the turbines are temporarily deranged and not infrequently stopped for long or short periods of time.

With this object in view my invention consists essentially in the disposition of an endless strainer in the fore-bay which is adapted to remove the frazil ice carried thereinto and elevate same to a conveyer for transportation to any appropriate dumping position.

The accompanying drawings are in diagrammatic illustration of convenient means for carrying out my invention.

Figure 1, is an end view of one convenient apparatus for effecting the object I have in view. Fig. 2 is a similar view of a modified form of the invention; and Fig. 3, is a plan thereof.

Similar characters of reference designate the same or analogous parts in all the several figures.

In the drawings and as more particularly illustrated by Fig. 1, 1, is an open-ended drain or cylinder constituted by spaced annular flanges, 2, connected together by longitudinal rods 3, 3. This drum is conveniently disposed on spaced idlers 4, 4, revolubly mounted in the fore-bay 5, in any appropriate manner. 6, 6, are additional idlers revolubly mounted in any convenient manner for keeping the drum properly positioned. 7, indicates any convenient form of motor for imparting rotation to the drum. 8, is an endless conveyer arranged longitudinally and internally of the drum 1, for the purpose hereafter explained. 9, is a rotary brush, 10, is a source of heat, for example gas flames; and 11, 11, are vulcanized rubber hammers adapted to intermittently rap on the outer surface of the drum 1.

In the form of my invention indicated by Figs. 2, and 3, I employ an endless perforate band or strainer 12, in lieu of the drum 1, and mount same on rotary drums 13, 13. It is to be noted that in this form of the invention the band or strainer 12, is mounted to travel through the fore-bay adjacent the inflow and it is disposed somewhat obliquely at 14, to constitute an elevator. 4, is an idler, 8, the endless conveyer, and 9, the rotary brush, preferably formed with a taper as shown in order that the frazil ice may be effectively brushed off the strainer 12, before it can have time to adhere thereto.

In operation and assuming that the drum 1, or endless strainer 12, is rotated in the direction of the arrows 15, 15, it will be readily seen that any frazil or needle ice carried by the inflow of water to the forebay 5, will be strained and collected on the inner surface, continued rotation of the drum 1, will elevate the accumulating ice to a level above the conveyer 8, whereupon the heat applied at 10, will liberate same and allow it to fall on the conveyer 8. Any particles of ice adhering to the strainer will be knocked off by the hammers 11, 11, or completely brushed off by the rotary brush 9. Thus it will be seen that I effectively prevent needle or other ice from being carried into the penstock tunnels, 16, Fig. 1.

17, Fig. 2, indicates where heat may be applied, and 18, Fig. 3, the direction of travel of the conveyer 8.

Obviously the details of arrangement and other combinations of the parts may be had without in any way departing from the spirit and scope of my invention and I wish it clearly understood that the forms outlined are by way of example only.

Having thus described my invention what I claim as new and desire to secure by Letters Patent, is:—

1. In a device for removing needle ice, the combination with a continuous strainer, of means for imparting movement to said strainer, a conveyer arranged in juxtaposition to said strainer and traveling at right angles to the direction of movement of said strainer, and a member rotating in contact with the internal face of said strainer for dislodging the ice from said strainer and discharging it upon said conveyer.

2. In a device of the character described, the combination with an annular strainer, of means for imparting bodily rotation thereto, a conveyer extending through said strainer and traveling at right angles to the direction of rotation thereof, and means for dislodging the ice from said strainer and discharging it upon said conveyer.

3. In a device of the character described, the combination with a ring-like strainer, the lower portion of which depends into the water from which the ice is to be removed, of a conveyer located above the water and extending into the interior of said ring-like strainer, and means for dislodging the ice from said strainer and discharging it upon said conveyer.

Signed at Hamilton, in the county of Wentworth, Province of Ontario, Dominion of Canada, this 19th day of June, A. D. 1913.

ALEXANDER MANN.

In the presence of—
ALFRED T. BRATTON,
GERTIE NICHOLSON.

Copies of this patent may be obtained for five cents each, by addressing the "Commissioner of Patents, Washington, D. C."